(12) United States Patent
Finner et al.

(10) Patent No.: US 6,488,339 B1
(45) Date of Patent: Dec. 3, 2002

(54) VEHICLE SEAT WITH A JOINT FOR RAPID ASSEMBLY

(75) Inventors: Holger Finner, Hückeswagen (DE); Rolf Schüler, Heiligenhaus (DE)

(73) Assignee: Keiper GmbH & Co, Kaiserslautern (DE)

(*) Notice: Subject to any disclaimer, the term of this patent is extended or adjusted under 35 U.S.C. 154(b) by 0 days.

(21) Appl. No.: 09/831,255

(22) PCT Filed: Aug. 8, 2000

(86) PCT No.: PCT/EP00/07661

§ 371 (c)(1),
(2), (4) Date: May 8, 2001

(87) PCT Pub. No.: WO01/17817

PCT Pub. Date: Mar. 15, 2001

(30) Foreign Application Priority Data

Sep. 9, 1999 (DE) .......................... 199 42 976

(51) Int. Cl.⁷ ................................. A47C 7/00
(52) U.S. Cl. ............... 297/440.16; 297/440.1; 297/440.2; 297/440.21; 297/440.15
(58) Field of Search .................. 297/440.16, 440.1, 297/440.13, 440.15, 440.2, 440.21

(56) References Cited

U.S. PATENT DOCUMENTS

| 984,709 A | * | 2/1911 | Ruggles |
| 2,650,657 A | * | 9/1953 | Ohlsson |
| 4,148,106 A | * | 4/1979 | Gallien |
| 5,156,422 A | | 10/1992 | Shibano |
| 5,269,589 A | | 12/1993 | Brothers et al. |
| 5,498,051 A | | 3/1996 | Sponsler et al. |
| 5,671,974 A | * | 9/1997 | Boycott et al. |
| 5,938,286 A | | 8/1999 | Jones et al. |

FOREIGN PATENT DOCUMENTS

| EP | 0488654 | * 11/1991 |
| EP | 0581648 A1 | 2/1994 |

* cited by examiner

Primary Examiner—Laurie K. Cranmer
(74) Attorney, Agent, or Firm—Alston & Bird LLP

(57) ABSTRACT

In a vehicle seat, in particular a motor vehicle seat, having a seat substructure (3) and a backrest (6) which is to be fastened to the seat substructure (3), the backrest (6) can be fastened to the seat substructure (3) by means of a quick-fitting connection (10, 13).

19 Claims, 2 Drawing Sheets

VEHICLE SEAT WITH A JOINT FOR RAPID ASSEMBLY

BACKGROUND OF THE INVENTION

The invention relates to a vehicle seat, in particular a motor-vehicle seat, having a backrest fastened to a seat substructure.

During production of known vehicle seats of this type, the metal structures of the seat substructure and of the backrest are first of all screwed together and then the upholstery is fitted. Variations in width and distortion of the seat substructure may result in the backrest adjuster becoming deformed and therefore in loss of comfort.

SUMMARY OF THE INVENTION

In accordance with one aspect of the invention, a vehicle seat has a backrest fastened to a seat substructure by means of a quick-fitting connection. The structures can first of all be upholstered separately and then assembled in a simple manner. If required, the seat substructure and backrest can be transported to the vehicle manufacturer's facility prior to being assembled and assembled only once there. This has the advantage of a smaller volume for transportation and an optimum packing density. This also enables different equipment versions of the seat substructure and backrest to be more easily combinable, either at the vehicle-seat manufacturer's facility or at the vehicle manufacturer's facility. The compensating of tolerances which is generally required can be shifted into this intersecting point between the seat substructure and backrest. The quick-fitting connection is preferably such that the seat substructure and backrest can be connected to one another without requiring the use of any tools, so that the assembly can be brought about in a simple manner. Screw connections, which in the prior art lead to deformation when there are variations in tolerance, are avoided by means of the screw-less and rivet-less quick-fitting connection of the present invention. Assembly generally takes place once during the production of the vehicle seat. However, the quick-fitting connection may, if appropriate, also be released in a controlled manner by the seat user and re-made if the seat user wants, for example, to create further storage space in his vehicle.

In a preferred embodiment, sockets into which feet of the backrest can be introduced are provided on the seat substructure. Sockets and feet may be provided the other way round on the other part in each case. The forces which act on the backrest, in particular in the event of a crash, are passed on via the feet and the sockets into the seat substructure. The sockets preferably have bolts which can be introduced into curved slots in the feet. Bolts and curved slots may be provided the other way around on the other part in each case. The quick-fitting connection is first latched in place by means of the bolts and curved slots, this latching being simple to produce and therefore being cost effective. As regards safety in a crash, curved slots have the advantage that it is not possible for a movement in a single direction to cause the bolts to leave the curved slots and that there is a positive lock in the respective other directions which, if the parts are dimensioned appropriately, absorbs very large crash forces. A respective socket and a foot having two bolts and curved slots in each case are preferably provided on each side of the vehicle seat. However, a different number of these latching elements may also be provided.

For further latching in place, a spring-loaded locking eccentric is provided which, in an assembled state of the vehicle seat, acts as a blocking element holding at least one of the available bolts in the associated curved slot. The eccentric shape produces a clamping action, i.e. securing by means of a force fit. A release catch is preferably provided in order to hold the blocking eccentric in an unlocked manner in a dismantled state of the vehicle seat. So that it is possible for this release latch to be released easily, in a dismantled state of the vehicle seat it is arranged in such a manner that it preferably traverses one of the curved slots, i.e. lies in the path to be covered by the bolt. In order to secure the blocking eccentric in the assembled state of the vehicle seat, a spring-loaded blocking pawl is preferably provided which prevents an unintentional opening movement of the blocking eccentric.

BRIEF DESCRIPTION OF THE DRAWINGS

In the following, the invention is explained in greater detail with reference to an exemplary embodiment illustrated in the drawings, in which.

DETAILED DESCRIPTION OF THE INVENTION

Figure 1:
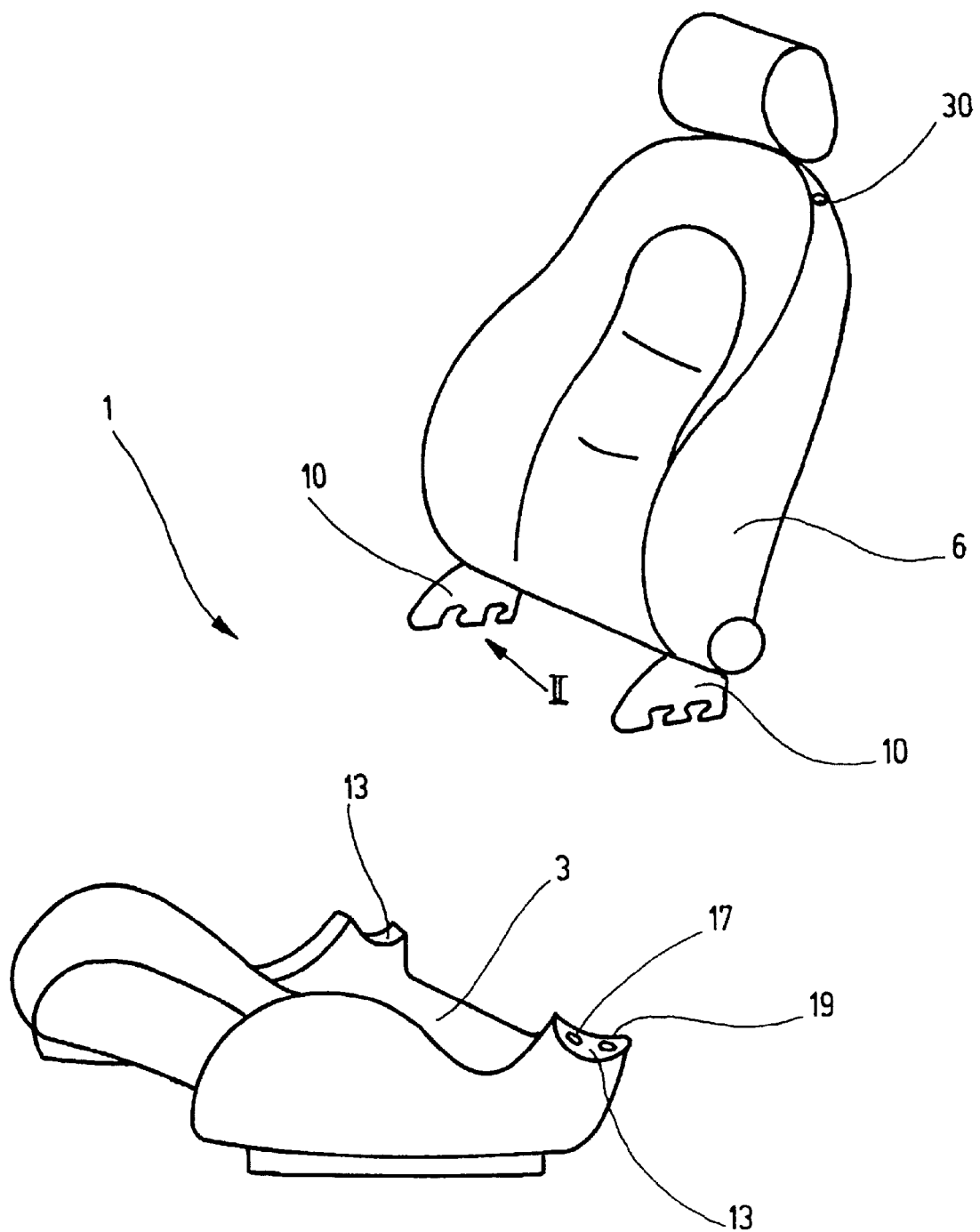
FIG. 1 shows a perspective, schematically illustrated view of the exemplary embodiment in the dismantled state.

A vehicle seat 1, which is designed as a front seat of a motor vehicle, has a seat substructure 3 for receiving a seat cushion, and a backrest 6. The following directional details refer to the orientation of the vehicle seat 1 as it is fitted into the motor vehicle and to the customary direction of travel of the latter. Two hinge fittings with a foot 10 screwed to each of their lower parts are provided at the sides of the lower edge of the backrest 6 as backrest adjusters. The seat substructure 3 has, on both sides at its rear end, a respective upwardly open socket 13 into which one of the feet 10 in each case is introduced. The two feet 10 and the two sockets 13 are formed in a mirror-inverted manner with respect to one another, and so in the following only those parts.which are provided on the left side of the vehicle seat 1 are described for this quick-fitting connection.

The foot 10 has the basic shape of a triangular plate standing upright in the longitudinal direction of the vehicle seat 1. On its lower side the foot 10 has a front curved slot 14 and a rear curved slot 16. The two curved slots 14 and 16, which are arranged one behind the other in the direction of travel, initially extend upward from the lower side of the foot 10 and then bend rearward. The two curved slots 14 and 16 respectively interact with the front and rear bolt 17 and 19. The two bolts 17 and 19 are fastened laterally within the socket 13, on its wall arranged further on the inside, and protrude from this wall in the direction toward the outside of the vehicle seat 1. The two bolts 17 and 19 are provided at their free ends with heads that are each thickened in the shape of a disk.

Figure 2:
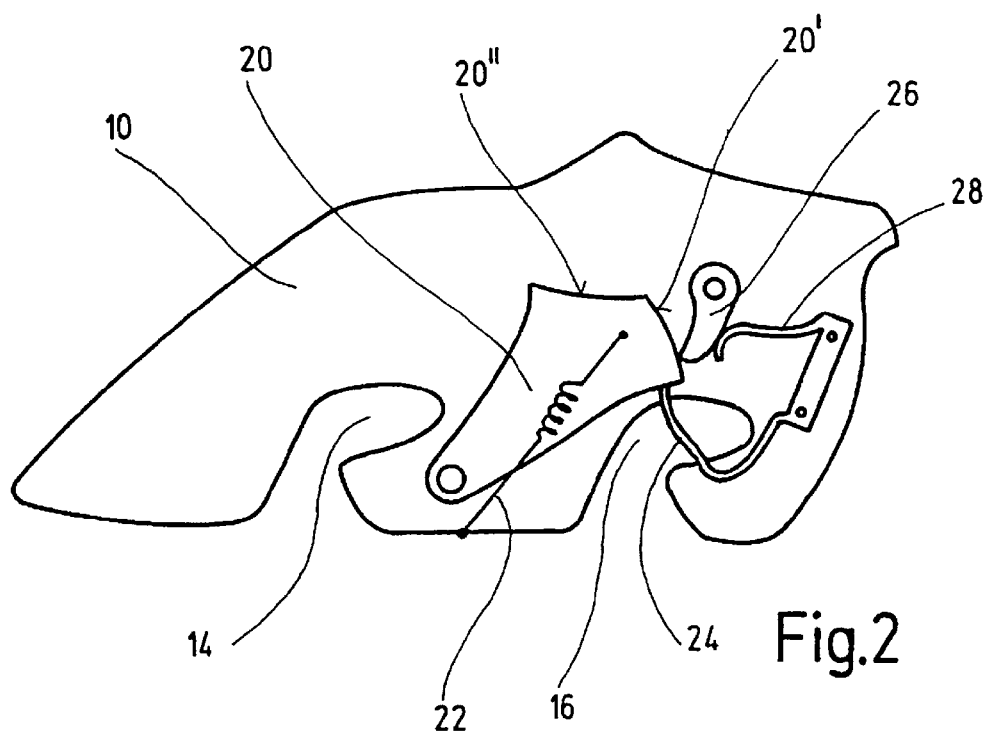
FIG. 2 shows a partial view of the exemplary embodiment in the dismantled state in the direction of the arrow II in FIG. 1.
Figure 3:
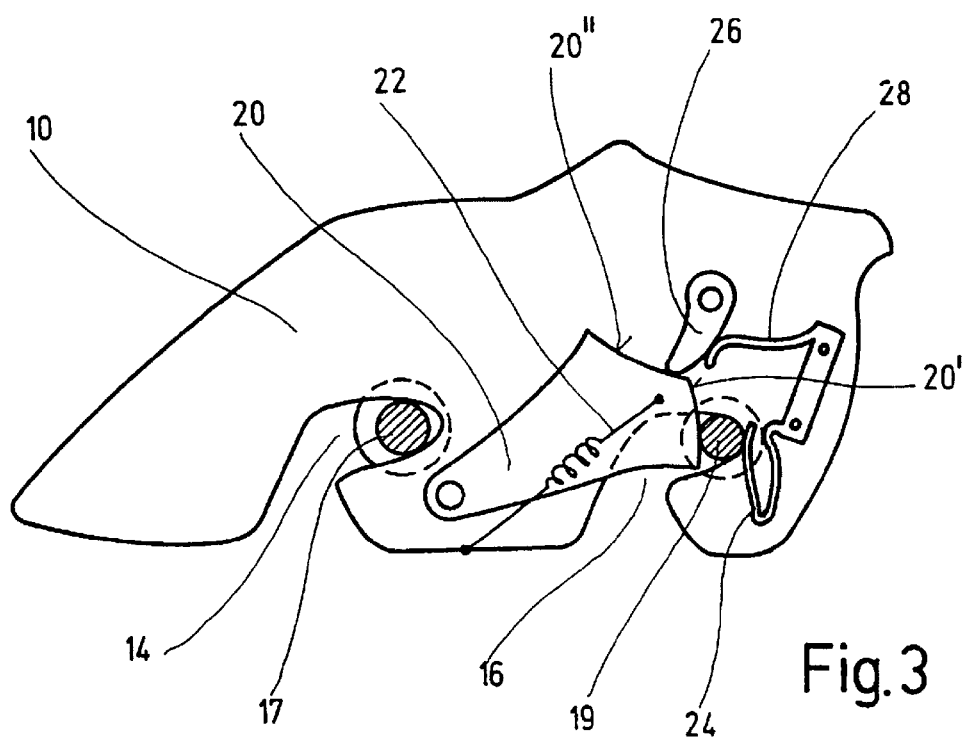
FIG. 3 shows a partial view of the exemplary embodiment corresponding to FIG. 2 in the assembled state.

In the following, the dismantled state, i.e. the state prior to the assembly of the seat substructure 3 and backrest 6, is described. A blocking eccentric 20, which can be pivoted about a horizontal rotational axis, is mounted on the inwardly facing side of the foot 10, between the two curved slots 14 and 16. The end of the blocking eccentric 20 which faces away from the rotational axis is arranged in the region of the rear curved slot 16 and is pulled downwards by a strong tension spring 22 which is fitted in the foot 10. A release catch 24, which is bent from spring steel, is fitted to the foot 10 behind the rear curved slot 16 and is guided from its fastening point first of all obliquely forward and then upward, so that it, when viewed as in FIG. 2, traverses the curved slot 16. The end of the release catch 24 bears in a positive-locking manner against the blocking eccentric 20 and thus acts counter to the tension spring 22. A blocking pawl 26 which is mounted on the foot 10 above the rear curved slot 16 first of all points downwards. A leaf spring 28, which is formed integrally with the release catch 24 in the exemplary embodiment, presses the blocking pawl 26 forward to bear against an eccentric surface 20' of the blocking eccentric 20, which surface runs eccentrically with respect to the rotational axis of the blocking eccentric 20.

During the assembly of the seat substructure 3 and backrest 6 each foot 10 is introduced into a respective socket 13. The curved slots 14 and 16 are respectively aligned with the bolts 17 and 19. During the lowering procedure the bolts 17 and 19 respectively enter into the curved slots 14 and 16, entering first of all into the part running upwards. The foot 10 now has to be pushed forward, so that the bolts 17 and 19 respectively enter into that part of the curved slot 14 and 16 which runs rearward. As this happens, the rear bolt 19 presses the release catch 24 rearward, with the result that the latter releases the blocking eccentric 20. The tension spring 22 pulls the blocking eccentric 20 downward until its eccentric surface 20, bears against the front side of the rear bolt 19. After the blocking eccentric 20 together with its eccentric surface 20' has been pulled downward, the blocking pawl 26 can pivot forward, with the assistance of the leaf spring 28, until it bears against a blocking surface 20" of the blocking eccentric 20 and is held there. The blocking eccentric 20 is thereby clamped in a fixed manner. As a direct consequence thereof, the rear bolt 19 is no longer able to move out of the rear curved slot 16, which means that the foot 10 is secured in the socket 13. The quick-fitting connection is therefore made without any tools.

As a means of indicating correct assembly, a signal button 30 is preferably provided on the backrest 6 and is triggered, for example, when the blocking eccentric 20 and blocking pawl 26 are in the designated positions. In order to separate the seat substructure 3 and backrest 6 again, a lever can be provided which pulls the blocking pawl 26 back counter to the force of the leaf spring 28. The blocking eccentric 20 is then pressed upwards away from the rear bolt 19 counter to the force of the tension spring 22, for example by means of a projection on the blocking pawl 26 or by means of a further lever, until the release catch 24 can support the blocking eccentric 20 again. In order to improve the lateral bearing of the foot 10 on the socket 13, the foot 10 can be provided in the region of the front curved slot 14 with a thickened portion having the thickness of the blocking eccentric 20 and the blocking pawl 26.

In order to compensate for tolerances, the front bolt 17 is preferably covered by a deformable, possibly elastic casing. However, this casing is entirely deformed in the event of a crash enabling the front bolt 17 to then bear directly against the foot 10.

What is claimed is:

1. A vehicle seat, comprising:
    a seat substructure and a backrest wherein a projection of one of the seat substructure and the backrest is for being inserted into a socket of the other of the seat substructure and the backrest to connect the seat substructure to the backrest, with one of the projection and the socket defining a curved slot for receiving a bolt of the other of the projection and the socket when the seat substructure is connected to the backrest;
    wherein the projection and the socket are configured, including the bolt and the curved slot being sized and shaped, so that the receiving of the bolt by the curved slot includes relative movement in a first direction between the bolt and the curved slot so that the bolt travels farther into the curved slot, and then relative movement in a second direction between the bolt and the curved slot so that the bolt travels farther into the curved slot than during the movement in the first direction, with the first and second directions being different;
    wherein the seat is constructed so that after the seat substructure is connected to the backrest via the movements in the first and second directions, the curved slot is operative so that removal of the bolt from the curved slot via movement in any single direction is restricted; and
    wherein the curved slot is defined by the projection and the vehicle seat further comprises:
        a blocking element pivotably mounted to the projection for pivoting between an open position and an obstructing position, with the blocking element at least partially obstructing the curved slot while the blocking element is in the obstructing position; and
        a spring for biasing the blocking element into the obstructing position,
        wherein the vehicle seat is operative so that:
            the blocking element does not prevent movement of the bolt farther into the curved slot while the blocking element is in the open position, and
            the blocking element moves into the obstructing position and restricts the bolt from moving out of the curved slot in response to the seat substructure being connected to the backrest via the relative movements in the first and second directions between the bolt and the curved slot.

2. A vehicle seat according to claim 1, wherein the seat substructure is connected to the backrest without the use of any tools.

3. A vehicle seat according to claim 1, further comprising a release catch which holds the blocking element in an open configuration while the seat substructure is not connected to the backrest.

4. A vehicle seat according to claim 3, further comprising a spring-loaded blocking pawl that restricts movement of the blocking element after the seat substructure is connected to the backrest.

5. A vehicle seat according to claim 1, further comprising a spring-loaded blocking pawl that restricts movement of the blocking element after the seat substructure is connected to the backrest.

6. A vehicle seat according to claim 1, wherein the bolt includes means for compensating for tolerances.

7. A vehicle seat according to claim 1, wherein the projection is a foot that is connected to the backrest.

8. A vehicle seat according to claim 1, further comprising a locking pawl pivotably mounted to the projection, wherein a spring biases the locking pawl into engagement with an eccentric surface of the blocking element in a manner that restricts movement of the blocking element out of the obstructing position while the seat substructure is connected to the backrest.

9. A vehicle seat according to claim 1, further comprising a biasing element for holding the blocking element in its open position prior to the seat substructure being connected to the backrest.

10. A vehicle seat, comprising:
a seat substructure and a backrest, wherein a projection of one of the seat substructure and the backrest is for being inserted into a socket of the other of the seat substructure and the backrest to connect the seat substructure to the backrest, with one of the projection and the socket defining a curved slot for receiving a bolt of the other of the projection and the socket when the seat substructure is connected to the backrest;
a spring-loaded blocking eccentric that restricts movement of the bolt within the curved slot after the seat substructure is connected to the backrest;
a release catch which holds the blocking eccentric in an open configuration while the seat substructure is not connected to the backrest;
wherein the release catch traverses the curved slot while the seat substructure is not connected to the backrest;
wherein the projection and the socket are configured, including the bolt and the curved slot being sized and shaped, so that the receiving of the bolt by the curved slot includes relative movement in a first direction between the bolt and the curved slot so that the bolt travels farther into the curved slot, and then relative movement in a second direction between the bolt and the curved slot so that the bolt travels farther into the curved slot than during the movement in the first direction, with the first and second directions being different; and
wherein the seat is constructed so that after the seat substructure is connected to the backrest via the movements in the first and second directions, the curved slot is operative so that removal of the bolt from the curved slot via movement in any single direction is restricted.

11. A vehicle seat according to claim 10, further comprising a spring-loaded blocking pawl that restricts movement of the blocking eccentric after the seat substructure is connected to the backrest.

12. A vehicle seat according to claim 11, wherein the bolt includes means for compensating for tolerances.

13. A vehicle seat according to claim 11, further comprising an indicating means for providing an indication in response to the seat substructure being connected to the backrest.

14. A vehicle seat, comprising:
a seat substructure and a backrest, wherein a projection of one of the seat substructure and the backrest is for being inserted into a socket of the other of the seat substructure and the backrest to connect the seat substructure to the backrest, with one of the projection and the socket defining a curved slot for receiving a bolt of the other of the projection and the socket when the seat substructure is connected to the backrest;
a spring-loaded blocking eccentric that restricts movement of the bolt within the curved slot after the seat substructure is connected to the backrest; and
a spring-loaded blocking pawl that restricts movement of the blocking eccentric after the seat substructure is connected to the backrest,
wherein the projection and the socket are configured, including the bolt and the curved slot being sized and shaped, so that the receiving of the bolt by the curved slot includes relative movement in a first direction between the bolt and the curved slot so that the bolt travels farther into the curved slot, and then relative movement in a second direction between the bolt and the curved slot so that the bolt travels farther into the curved slot than during the movement in the first direction, with the first and second directions being different, and
the seat being constructed so that after the seat substructure is connected to the backrest via the movements in the first and second directions, the curved slot is operative so that removal of the bolt from the curved slot via movement in any single direction is restricted.

15. A vehicle seat according to claim 14, further comprising a release catch which holds the blocking eccentric in an open configuration while the seat substructure is not connected to the backrest.

16. A vehicle seat, comprising:
a seat substructure and a backrest, wherein a projection of one of the seat substructure and the backrest is for being inserted into a socket of the other of the seat substructure and the backrest to connect the seat substructure to the backrest, with one of the projection and the socket defining a curved slot for receiving a bolt of the other of the projection and the socket when the seat substructure is connected to the backrest,
wherein the bolt includes moans for compensating for tolerances,
wherein the projection and the socket are configured, including the bolt and the curved slot being sized and shaped, so that the receiving of the bolt by the cured slot includes relative movement in a first direction between the bolt and the curved slot so that the bolt travels farther into the curved slot, and then relative movement in a second direction between the bolt and the curved slot so that the bolt travels farther into the curved slot than during the movement in the first direction, with the first and second directions being different, and
the seat being constructed so that after the seat substructure is connected to the backrest via the movements in the first and second directions, the curved slot is operative so that removal of the bolt from the curved slot via movement in any single direction is restricted.

17. A vehicle seat, comprising:
a seat substructure and a backrest for being connected to one another, with one of the seat substructure and the backrest including a plurality of bolts, and the other of the seat substructure and the backrest including a plurality of curved slots for respectively receiving the bolts when the seat substructure is connected to the backrest;
a blocking element mounted for pivoting between an open position and an obstructing position, with the blocking element at least partially obstructing a first curved slot of the curved slots while the blocking element is in the obstructing position; and
a spring for biasing the blocking element into the obstructing position,
wherein the bolts and the curved slots are sized, shaped and arranged so that for each bolt and the respective curved slot, the receiving of the bolt by the curved slot to connect the seat substructure to the backrest includes relative movement in a first direction between the bolt and the curved slot so that the bolt travels farther into the curved slot, and then relative movement in a second direction between the bolt and the curved slot so that the bolt travels farther into the curved slot than during the movement in the first direction, with the first and second directions being different, and wherein the vehicle seat is operative so that:

the blocking element does not prevent movement of a first bolt of the bolts farther into the first curved slot while the blocking element is in the open position, and the blocking element moves into the obstructing position and restricts the first bolt from moving out of the first curved slot in response to the seat substructure being connected to the backrest via the relative movements in the first and second directions respectively between the bolts and the curved slots, and the seat being constructed so that after the seat substructure is connected to the backrest via the relative movements in the first and second directions respectively between the bolts and the curved slots, the curved slots are operative so that removal of the bolts from the curved slots via movement in any single direction is restricted.

18. A vehicle seat according to claim 17, further comprising a pivotably mounted locking pawl that is biased by a spring to engage an eccentric surface of the blocking element in a manner that restricts movement of the blocking element out of the obstructing position.

19. A vehicle seat according to claim 18, further comprising a biasing element for holding the blocking element in its open position prior to the seat substructure being connected to the backrest.

* * * * *